Sept. 30, 1930.   A. E. TURVILLE ET AL   1,776,960
COMBINED OPHTHALMOSCOPE AND SLIT LAMP
Filed Nov. 17, 1927
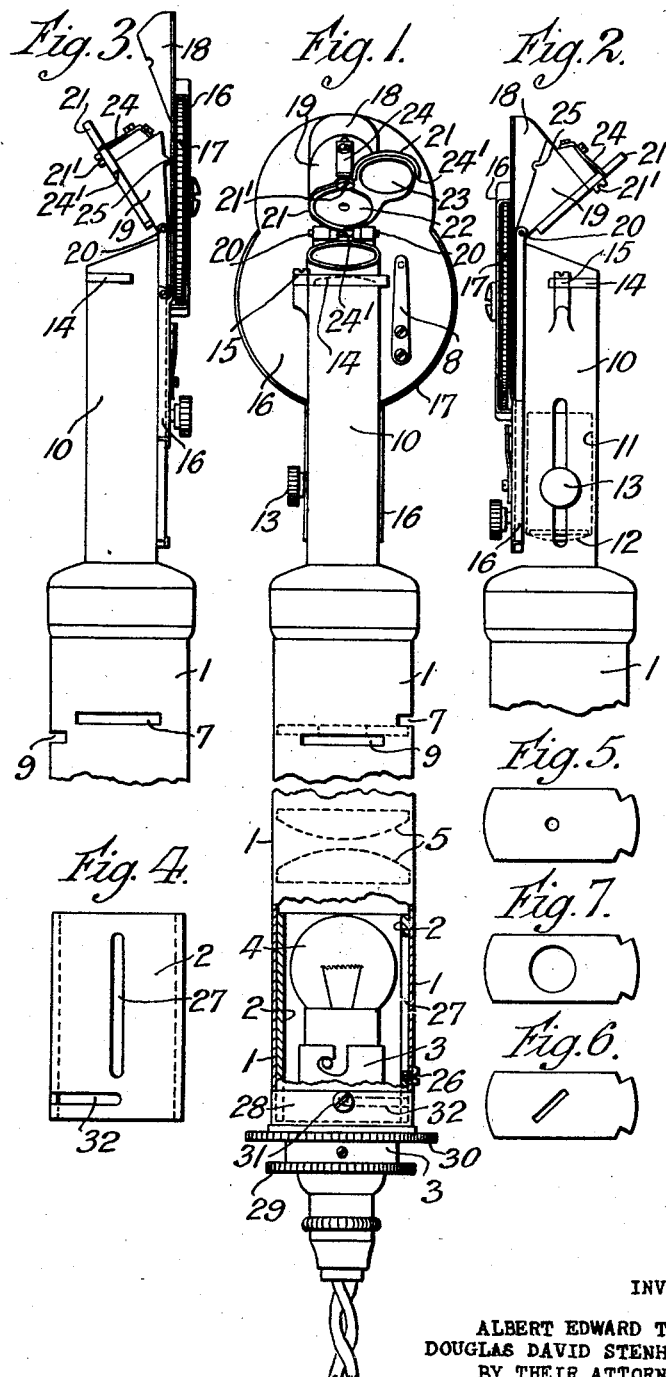
INVENTORS:
ALBERT EDWARD TURVILLE,
DOUGLAS DAVID STENHOUSE STEWART,
BY THEIR ATTORNEYS Patented Sept. 30, 1930

1,776,960

UNITED STATES PATENT OFFICE

ALBERT EDWARD TURVILLE AND DOUGLAS DAVID STENHOUSE STEWART, OF NORTHAMPTON, ENGLAND

COMBINED OPHTHALMOSCOPE AND SLIT LAMP

Application filed November 17, 1927, Serial No. 233,897, and in Great Britain December 11, 1926.

The invention consists in an instrument which can be used either as a slit-lamp or as an ophthalmoscope. It may also be used as a retinoscope, and is adaptable for red-free illumination and other forms of light filtering.

The main feature of the invention is the mounting of the ophthalmoscope mirror support. This support is pivoted on an axis which does not pass through the inspection hole, so that when it is proposed to use the apparatus as a slit-lamp, the support may be tilted to one side and the part of the eye which it is desired to examine can be viewed past the edge of the mirror obliquely to the beam. Preferably the support carries two mirrors, one of which is of the ordinary kind, while the other is a polished steel plate, this second mirror being brought into use when the apparatus is used as a slit-lamp.

The invention is illustrated in the accompanying drawings, in which Figure 1 is a part sectional general view; Figures 2 and 3 are views of the upper part of Figure 1 at right angles thereto, regarded from opposite aspects; Figure 4 is a detail of Figure 1, and Figures 5 and 6 are views of stops and Figure 7 is a view of a screen as hereinafter described.

1 is a casing containing a sliding tube 2, in which is a rotatable holder 3 for carrying an incandescent lamp 4, such as a 60 candle power electric bulb lamp. The power of the lamp can be varied by any suitable means, such as a rheostat, not shown. Mounted in the casing is a condenser 5; the casing has also slots 7 and 9, adapted to receive slides constituting stops or screens as shown typically in Figures 5, 6 and 7, the form and use of which will be explained hereafter.

The casing has a tubular extension 10, within which a tube 11 is slidably mounted. The tube 11 carries a convex lens 12 whose position can be adjusted by a stud 13 carried by the tube 11. At the outer end of the extension 10 is another convex lens 14 which is pivoted at 15 so that it can be thrown out of use. The extension 10 also carries slidably mounted thereon a casing 16, containing the usual rotatable battery of lenses 17 which can be fixed in any position by a spring catch 8. The casing 16 carries a wedge 18, adapted for engagement with a second wedge 19 which is pivoted at 20 in the extension 10 by a spring-influenced pivot, and carries a mirror holder 21 which is pivoted thereon and carries preferably, as shown, two mirrors 22, 23, of which the mirror 22 is of glass and perforated with a central inspection hole, the mirror 23 being of polished steel or some other substance which reflects from one surface only. Either mirror can be brought into action by turning the holder on its pivot 21'. A light spring 24, acting in conjunction with stops 24' on the mirror holder, is provided for retaining the holder in one or other of its extreme positions. The wedge 19 carries on its back a small bar or stop 25 which abuts against the casing 16 when the two wedges are not in engagement, and holds the wedge in its proper position. The spring pivot above mentioned tends to press the wedge 19 against the other wedge 18, or against the casing 16, as the case may be, as shown in Figures 2 and 3 respectively.

It will be noted that the axis of the pivot 20 lies substantially in the plane of the mirror holder 21, but does not pass, under any circumstances, through the central inspection hole of the mirror 22 or the centre of the mirror 23, so that when, as shown in Figure 3, the casing 16 is in its extended position, a view can be obtained through any one of the battery lenses past the edge of the mirror.

To enable the lamp to be adjusted, the tube 2 is adapted to slide telescopically in the casing 1, but is prevented from rotation by a screw 26, which engages in a slot 27 in the tube. The lamp holder 3 is carried friction-tight in a supporting sleeve 28, within which it can be turned but not moved axially by an adjusting ring 29. The sleeve 28 is carried rotatably on the end of the tube 2 which projects beyond the casing 1. The sleeve is provided with an adjusting ring 30, and the relative movement of the sleeve and tube is limited to 90° by a screw 31 on the sleeve which engages in a slot 32 in the tube. The lamp holder can thus be turned to any extent in the sleeve 28 and can be drawn in and out by the tube 2. The rotatable mounting of the sleeve 28 on the tube 2 is provided as it is sometimes convenient to turn the lamp through 90° from some other position.

The relationship and objects of the various parts will be understood from the following description of typical adjustments which, however, must not be understood to be the only ones, as they may be varied according to circumstances and the experience of the operator.

For retinoscopy.

A slide, such as shown in Figure 5, having a round hole, of say, 1 mm. in diameter, is placed in the slot 7, and a slide, such as shown in Figure 7, having a ground glass screen, is placed in the slot 9. The ground glass screen becomes virtually the source of illumination. The lens 14 is thrown out of use, and care should be taken either that the inspection hole in the mirror 22 is clear of lenses of the battery, or else that the lens in place corresponds to the operator's refractive error. The light should be turned on to half power, and the lens battery retracted. The mirror 22 is used. If now in the darkened room the beam of light is thrown on to a wall a few feet away while the lamp holder 3 is withdrawn, so that the brightest patch of light is obtained which patch is focussed to a sharp edged circle by the sliding tube 11, a parallel beam is produced. For plane mirror retinoscopy, the slider 11 is withdrawn towards the light source by three or four millimetres, thus producing a uniform diverging beam. For concave mirror retinoscopy, the slider 11 is moved a few millimetres in the contrary direction.

For ophthalmoscopy.

In the case of large pupils, a slide, such as is shown in Figure 5, having a hole of, say, 8 mm. in diameter, is placed in the slot 9 the slot 7 is left empty and the lens 14 is thrown into use. The lamp holder is pushed in as far as it will go, and the rheostat adjusted for half illumination. The best position for the slider 11 can be found while the instrument is in use, starting from half way. In the case of small pupils, or for inspecting a small area on any fundus, the circle of illumination should be about half a disk in diameter. In this case the adjustments are substantially the same as before, excepting that a slide is used in the slot 9, having a hole of 1 or 2 mm. in diameter, the lens 14 being thrown out of use.

For red-free illumination with either of the above adjustments, a slide, such as is shown in Figure 7, having a red-free screen, is placed in the slot 7.

For slit-lamp examination with a separate corneal magnifier, the lens 14 is thrown into use, the slots 7 and 9 are empty, and the slider 11 is a few millimetres from its position nearest the source of illumination. About half illumination is used, and the tube 2 and holder 3 adjusted so that an image of the lamp filament is focussed on the wall, which image should be vertical when the instrument is held vertically. A slide, such as is shown in Figure 6, which may have a half or one millimetre slit for a narrow or wide beam, is inserted in the slot 9 so that the direction of the slit is parallel with the lamp filament. The light should then be turned up fully or nearly so, and the slit is focussed on to a smooth surface 5 cms. or so from the mirror. The length of the section of the slit beam may be reduced by inserting a slide, such as is shown in Figure 5, in the slot 7.

If it is required to make an examination with the 20.00 D. lens in the battery of lenses, the same adjustments are made as before, and the battery of inspection lenses is pushed out as far as it will go so that the wedges 18 and 19 are disengaged. The steel mirror is used, and the 20.00 D. lens is brought into position opposite the battery sight hole. The slit slide is withdrawn, turned over and replaced, so that the slit is at right angles to its former position, and the lamp filament is similarly adjusted.

Various other adjustments may be made. For instance ophthalmoscopy may be carried out with the ground glass slide in either of the slots 7 and 9. The lens 14 may be in or out of use, and many other combinations may be employed.

The instrument may be modified in various ways. For example, one mirror only may be mounted on the wedge 19 instead of two as described, or instead of interchangeable stops, adjustable ones of any well known type may be used.

If the parts which render the apparatus specially applicable as a slit-lamp, such as the movable wedge shaped mirror carrier, be dispensed with, the apparatus constitutes a novel form of ophthalmoscope, the novelty consisting in the use in an ophthalmoscope of a condenser and a stop or screen, coloured or otherwise, between the source of illumination and the ordinary focussing lenses. The hole in the stop or screen may then become substantially the source of illumination.

What we claim is:—

1. A combined ophthalmoscope, slit-lamp and retinoscope, comprising a source of illumination, a condenser, lens means for focussing, an oblique mirror for directing a beam of light into the eye, a sliding member adapted to be moved relative to said mirror and parallel to the optical axis of the condenser and focusing means, a battery of inspection lenses mounted on the said slider, thus enabling a view to be obtained either through the mirror or past its edge, variable stopping means between the condenser and the focussing means, a mounting for the mirror, and a pivot on which the mounting can be turned, the axis of the said pivot being substantially in the plane of the said mirror, but out of line with the centre thereof.

2. A combined ophthalmoscope, slit-lamp, and retinoscope, as claimed in claim 1, characterized in that the variable stopping means comprises interchangeable stops which include stops having openings in the form of a slit.

3. A combined ophthalmoscope, slit-lamp and retinoscope, as claimed in claim 1, comprising a wedge carried by the sliding member, and a corresponding wedge on the mounting of the mirror, the two wedges being adapted to engage and disengage when the slide is moved to its extreme positions, thus tilting the mirror.

4. A combined ophthalmoscope, slit-lamp and retinoscope, as claimed in claim 1 wherein the focusing means comprises lens means adapted to be moved parallel to the optical axis, a lens situated between the said lens means and the mirror, and a pivoted support for said lens whereby it can be thrown out of use.

5. In a combined ophthalmoscope, slit-lamp and retinoscope, as claimed in claim 1, means for introducing screens between the condenser and the focussing means.

6. In a combined ophthalmoscope, slit-lamp and retinoscope, as claimed in claim 1, a pair of oblique mirrors carried pivotally in the same mounting and adapted to be brought into use alternatively, one of the said mirrors being adapted to reflect from one surface only.

7. In a combined ophthalmoscope, slit-lamp and retinoscope as claimed in claim 1 an adjustable mounting for the source of illumination, said mounting comprising a lamp holder, a sleeve supporting the said lamp holder within which sleeve the lamp holder can be rotated but not moved axially, a tube adapted to slide axially but not to rotate in the casing of the instrument, which tube carries the said sleeve rotatably, and means for limiting the relative rotation of the tube and sleeve to 90°.

8. An ophthalmoscope comprising a source of illumination, lens focusing means, an oblique mirror for directing a beam of light into the eye, a sliding member adapted to be moved relative to said mirror and parallel to the optical axis of the focusing means, a battery of inspection lenses mounted on the said slider thus enabling a view to be obtained either through the mirror or past its edge, a condenser situated between the source of illumination and the focussing means and a stop situated between the condenser and the focussing means.

9. An ophthalmoscope comprising a source of illumination, lens focussing means, an oblique mirror for directing a beam of light into the eye, a sliding member adapted to be moved relative to said mirror and parallel to the optical axis of the focusing means, a battery of inspection lenses mounted on the said slider thus enabling a view to be obtained either through the mirror or past its edge, a condenser situated between the source of illumination and the focussing means and a screen situated between the condenser and the focussing means.

10. In an ophthalmoscope as claimed in claim 8 an adjustable mounting for the source of illumination, said mounting comprising a lamp holder, a sleeve supporting the lamp holder within which sleeve the lamp holder can be rotated but not moved axially, a tube adapted to slide axially but not to rotate in the casing of the instrument, which tube carries the said sleeve rotatably, and means for limiting the relative rotation of the tube and sleeve to 90°.

11. In an ophthalmoscope as claimed in claim 9, an adjustable mounting for the source of illumination, said mounting comprising a lamp holder, a sleeve supporting the said lamp holder, within which sleeve the lamp holder can be rotated but not moved axially, a tube adapted to slide axially but not to rotate in the casing of the instrument, which tube carries the said sleeve rotatably, and means for limiting the relative rotation of the tube and sleeve to 90°.

In testimony that we claim the foregoing as our invention we have signed our names this 27th day of October, 1927.

ALBERT EDWARD TURVILLE.
DOUGLAS DAVID STENHOUSE STEWART.